United States Patent
Kery et al.

(10) Patent No.: US 10,433,565 B2
(45) Date of Patent: Oct. 8, 2019

(54) MEAT TENDERNESS BY COLLAGEN DEGRADATION USING HIFU

(71) Applicants: Nasglen Pty Ltd, Bondi Junction (AU); Jais Pty Ltd, Castle Cove (AU)

(72) Inventors: Robert Thomas Kery, Castle Cove (AU); John Anton Gal, Castlecrag (AU)

(73) Assignees: Nasglen Pty Ltd, Bondi Junction (AU); Jais Pty Ltd, Castle Cove (AU)

( * ) Notice: Subject to any disclaimer, the term of this patent is extended or adjusted under 35 U.S.C. 154(b) by 669 days.

(21) Appl. No.: 15/080,267

(22) Filed: Mar. 24, 2016

(65) Prior Publication Data
US 2017/0273319 A1  Sep. 28, 2017

(51) Int. Cl.
A22C 9/00 (2006.01)
A22C 29/02 (2006.01)
A22C 25/00 (2006.01)
A22C 21/00 (2006.01)

(52) U.S. Cl.
CPC ............ *A22C 9/00* (2013.01); *A22C 21/00* (2013.01); *A22C 25/00* (2013.01); *A22C 29/02* (2013.01)

(58) Field of Classification Search
CPC .... A22C 9/00; A22B 5/00; A22B 3/00; A22B 3/06
USPC ................................................ 452/141, 198
See application file for complete search history.

(56) References Cited

U.S. PATENT DOCUMENTS

| | | | | |
|---|---|---|---|---|
| 3,711,896 A | | 1/1973 | Guberman et al. | |
| 5,273,766 A | * | 12/1993 | Long .................. | A22C 9/00 426/234 |
| 6,146,262 A | * | 11/2000 | Long .................. | A22C 9/00 426/234 |
| 6,264,543 B1 | * | 7/2001 | Garcia ................ | A22C 9/002 452/141 |
| 6,478,667 B2 | * | 11/2002 | Bell .................... | A22B 5/0017 452/141 |
| 6,669,546 B2 | * | 12/2003 | Long .................. | A22C 9/00 452/141 |
| 9,585,405 B2 | * | 3/2017 | Hughes, Jr. ........ | A22B 5/0088 |

OTHER PUBLICATIONS

"High-intensity focused ultrasound," accessed at https://web.archive.org/web/20150411022303/http://en.wikipedia.org/wiki/High-intensity_focused_ultrasound, last modified on Mar. 9, 2015, pp. 10.
Berns, MW., et al., "Human Corneal Ablation Threshold Using the 193 nm ArF Excimer Laser," Investigative Ophthalmology & Visual Science, vol. 40, No. 5 pp. 826-830 ( Apr. 1999).
Chang, H-J., et al., "Effects of Characteristics Changes of Collagen on Meat Physicochemical Properties of Beef Semitendinosus Muscle during Ultrasonic Processing," Food and Bioprocess Technology, vol. 5, Issue 1, pp. 285-297 (Jan. 2012).
Zhou, Y-F., "High Intensity focused ultrasound in clinical tumor ablation," World journal of clinical oncology, vol. 2, Issue 1, pp. 8-27 (Jan. 10, 2011).

* cited by examiner

Primary Examiner — Richard T Price, Jr.
(74) Attorney, Agent, or Firm — IP Spring

(57) ABSTRACT

Disclosed herein are systems for tenderizing meat samples using High-Intensity Focused Ultrasound (HIFU) comprising one or more transducer arrays. Further disclosed are methods and uses of the systems to tenderize meat samples.

76 Claims, 7 Drawing Sheets

MEAT TENDERNESS BY COLLAGEN DEGRADATION USING HIFU

BACKGROUND

Tenderness is one of the main determinants of meat quality and therefore its market value. Tenderness is a measure of the force required to shear muscle tissue and is influenced by the nature of the myofibrils in the muscle and the extent of collagen in the muscle. Collagen is a long, stiff protein comprising three separate molecules composed of amino acid chains, twisted around each other, making the collagen difficult to shear. The more collagen there is in a piece of meat, the tougher it is to cut and therefore to chew.

SUMMARY

Some embodiments disclosed herein provide systems for tenderizing meat comprising: a transducer array; an impedance matching layer; and a controller, wherein the transducer array is configured by the controller to transmit ultrasound to multiple focal points in a meat sample in contact with the impedance matching layer.

In some embodiments, the transducer array comprises a plurality of piezoceramic transducer elements. In some embodiments, the transducer array comprises at least 100 piezoceramic transducer elements. In some embodiments, the transducer array comprises at least 500 piezoceramic transducer elements. In some embodiments, the transducer array comprises at least 1,000 piezoceramic transducer elements. In some embodiments, the transducer array is a random phased array. In some embodiments, the random phased array is configured to transmit ultrasound to at least 5 focal points. In some embodiments, the random phased array is configured to transmit ultrasound to at least 10 focal points. In some embodiments, each focal point is about 100 $mm^3$. In some embodiments, each focal point is about 1,000 $mm^3$.

In some embodiments, the transducer array is a linear transducer array. In some embodiments, the transducer array is an annular transducer array. In some embodiments, the annular transducer array has a convergence angle of less than 80°. In some embodiments, the annular transducer array has a convergence angle of less than 40°. In some embodiments, the annular transducer array has a convergence angle of less than 20°. In some embodiments, the annular transducer array has a convergence angle of less than 10°. In some embodiments, the annular transducer array has a convergence angle of less than 5°.

In some embodiments, the transducer array is configured to achieve sufficient energy for high speed cavitation at the multiple focal points in the meat sample. In some embodiments, the transducer array is configured to achieve sufficient temperature for high speed ablation at the multiple focal points in the meat sample. In some embodiments, the transducer array has an average power of 20-40 $W/cm^2$. In some embodiments, the transducer array achieves at least 100 fold increase of energy at each of the multiple focal points. In some embodiments, the transducer array achieves at least 300 fold increase of energy at each of the multiple focal points. In some embodiments, the transducer array achieves a temperature of 45-100° C., a power of 100-10,000 $W/cm^2$, and a frequency of 20 kHz-20 MHz at each of the multiple focal points.

In some embodiments, the transducer array achieves a power of 1,600-2,000 $W/cm^2$, and a frequency of 20 kHz-1 MHz at each of the multiple focal points. In some embodiments, the multiple focal points of the transducer array are arranged to form a pattern. In some embodiments, the multiple focal points of the transducer array are arranged to form a three-dimensional pattern. In some embodiments, the impedance matching layer comprises a gel pad.

In some embodiments, the controller sets the energy per focal point, focus area per focal point or granularity and pattern of the multiple focal points. In some embodiments, the systems further comprise a mapping device configured to identify target regions for ablation or cavitation in the meat sample. In some embodiments, the mapping device comprises an ultrasound imaging device. In some embodiments, the ultrasound imaging device creates a three-dimensional map of a plurality of target regions in the meat sample. In some embodiments, the mapping device comprises an ultrasound elastography device. In some embodiments, the ultrasound elastography device maps the relative stiffness of the meat sample. In some embodiments, the mapping device comprises a computed axial tomography (CT) scanning device. In some embodiments, the CT scanning device creates a three-dimensional map of a plurality of target regions in the meat sample. In some embodiments, the mapping device comprises an X-ray imaging device. In some embodiments, the X-ray imaging device creates a three-dimensional map of a plurality of target regions in the meat sample.

In some embodiments, the systems comprise a plurality of transducer arrays. In some embodiments, the system is a hand-held system. In some embodiments, the system is an automated system. In some embodiments, the automated systems comprise a head assembly. In some embodiments, the head assembly comprises the transducer array. In some embodiments, the automated system comprises a conveyor to transport the meat sample. In some embodiments, the automated systems comprise a sensor that detects the presence of the meat sample. In some embodiments, the automated systems comprise a computer.

Some embodiments disclosed herein provide methods for tenderizing meat using a system disclosed herein, comprising: a) placing a meat sample in contact with the impedance matching layer; and b) focusing the transducer array to the multiple focal points in the meat sample using the controller, wherein the tenderness of the meat sample is increased.

In some embodiments, the methods comprise cavitating the collagen fibers at the multiple focal points in the meat sample. In some embodiments, the cavitation is high-speed cavitation. In some embodiments, the methods comprise ablating the collagen fibers at the multiple focal points in the meat sample. In some embodiments, the ablation is high-speed ablation.

In some embodiments, the methods comprise identifying the multiple focal points in the meat sample using a mapping device. In some embodiments, the methods comprise setting the energy per focal point, focus area per focal point or granularity and pattern of the multiple focal points. In some embodiments, the transducer array is a linear transducer array. In some embodiments, the focusing comprises phase focusing the linear transducer array.

In some embodiments, the methods comprise transporting the meat sample using a conveyor. In some embodiments, the methods comprise detecting the meat sample using a sensor. In some embodiments, the methods comprise firing the transducer array at the meat sample if the meat sample is detected by the sensor. In some embodiments, the transducer array is mounted on a head assembly. In some embodiments, the methods comprise lowering the head assembly so that an impedance matching layer is in contact with the meat sample. In some embodiments, more than one meat samples are processed simultaneously. In some embodiments, at least 10 meat samples are processed simultaneously. In some embodiments, the meat sample comprises sliced meat or ground meat. In some embodiments, the meat sample is selected from the group consisting of bison, beef, veal, camel, cat, dog, elephant, frog, goat, guinea pig, horse, lamb, llama, pork, yak, turkey, chicken, duck, goose, crocodile, grouse, kangaroo, ostrich, partridge, pheasant, guail, rabbit, pigeon, venison, fish, crab, shrimp and whale. In some embodiments, the meat sample is for human or animal consumption.

Some embodiments disclosed herein provide uses of a system disclosed herein for tenderizing a meat sample, wherein the tenderness of the meat sample is increased.

In some embodiments, the uses comprise placing a meat sample in contact with the impedance matching layer. In some embodiments, the uses comprise focusing the transducer array to the multiple focal points in the meat sample using the controller. In some embodiments, the uses comprise cavitating the collagen fibers at the multiple focal points in the meat sample. In some embodiments, the cavitation is high-speed cavitation. In some embodiments, the uses comprise ablating the collagen fibers at the multiple focal points in the meat sample. In some embodiments, the ablation is high-speed ablation.

In some embodiments, the uses comprise identifying the multiple focal points for ablation or cavitation using a mapping device. In some embodiments, the uses comprise setting the energy per focal point, focus area per focal point or granularity and pattern of the multiple focal points. In some embodiments, the uses are for simultaneously processing more than one meat samples. In some embodiments, the uses are for simultaneously processing more than 10 meat samples.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
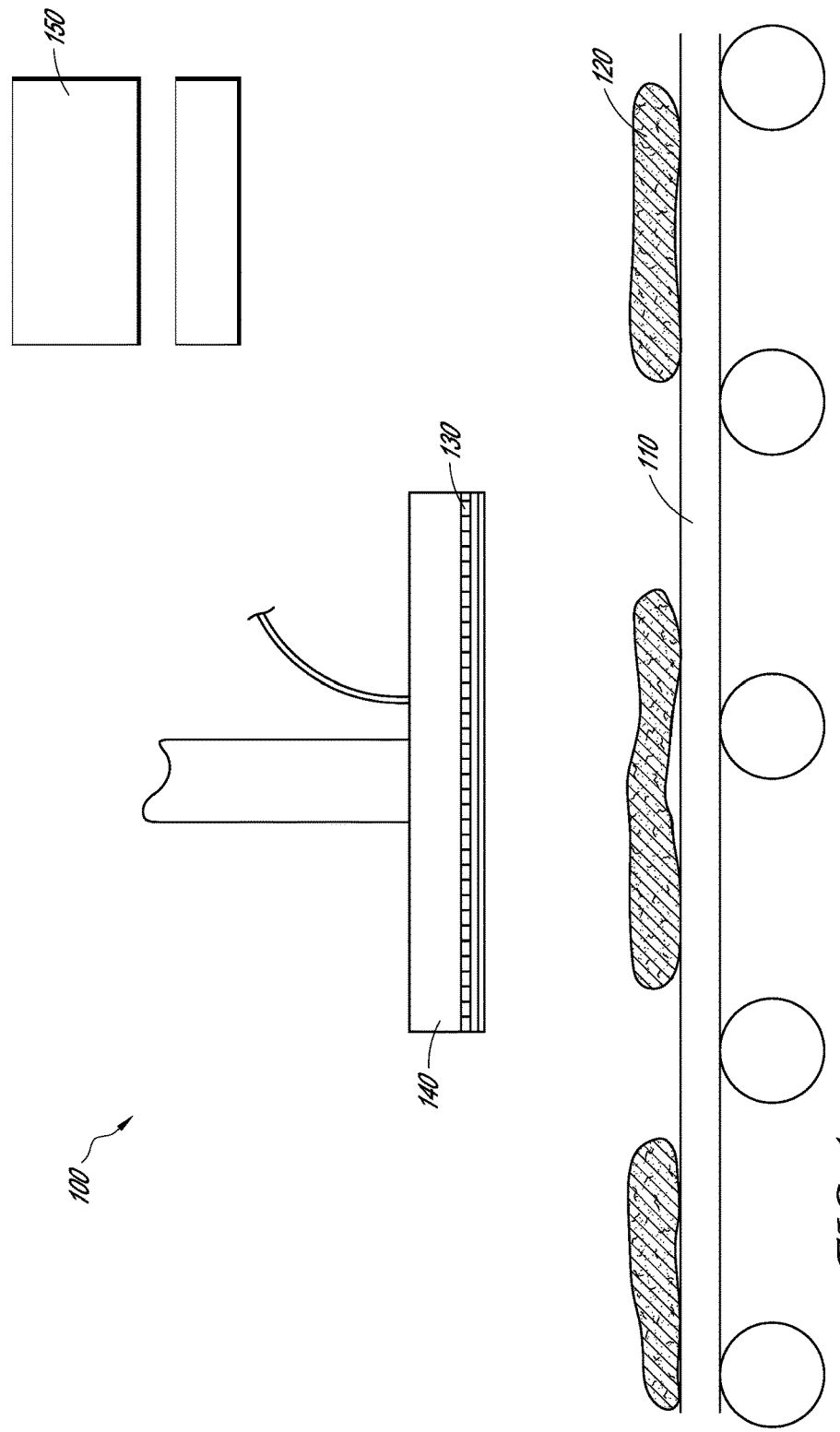
FIG. 1 shows a schematic illustration of an exemplary embodiment of an automated system for tenderizing meat.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

High-Intensity Focused Ultrasound (HIFU, or sometimes FUS (for Focused UltraSound)) is currently used in medicine, as a non-invasive or minimally invasive therapy, to locally heat and destroy diseased or damaged tissue through ablation, as described in Yu-Feng Zhou, *World J. Clin. Oncol.*, 2011, January 10:2(1):9-27, "High intensity focused ultrasound in clinical tumor ablation," the content of which is hereby incorporated by reference in its entirety. It is commonly used for the treatment of prostate, breast, liver and other cancers. The instant disclosure describes devices and systems of using HIFU to increase tenderness in meat products, and uses thereof.

Meat Tenderizing Systems

Some embodiments disclosed herein provide systems for tenderizing meat.

Systems disclosed herein may increase tenderness of a meat sample using HIFU technology. In some embodiments, the systems comprise a transducer array wherein the transducer array is configured to transmit ultrasound to multiple focal points in the meat sample.

The systems disclosed herein may be a hand-held system, wherein an operator, e.g., a human being, places the system in contact with a meat sample, and fires the transducer array(s) at the meat sample. Alternatively, the systems disclosed herein may be an automated system.

FIG. 1 shows a schematic illustration of an exemplary embodiment of an automated system 100 for tenderizing meat. For example, the systems may comprise a conveyor 110 for transporting the meat samples 120 to be tenderized toward the transducer array(s) 130, where the transducer array(s) 130 may fire on the meat samples 120. In some embodiments, the systems comprise a head assembly 140 comprising the transducer array(s) 130 for tenderizing a meat sample. Once the meat sample 120 is transported under the head assembly 140, the head assembly may be lowered, so that the transducer array(s) 130 mounted on the head assembly 140 will come into contact with the meat sample 120, and fire at the meat sample 120. It would be appreciated that a sensor may be included in the system to detect the meat sample 120. Upon detection of the meat sample 120, the transducer array(s) 130 will be activated. If no meat sample 120 is detected, the transducer array(s) 130 will not be activated.

In some embodiments, the systems 100 comprise a transducer electronics—which generates electrical signals to the transducers to create ultrasound focused on various targets in the piece of meat being processed. In some embodiments, the systems 100 comprise a computer 150 that establishes and controls, e.g., the movement of the conveyor; the movement of the assembly head; and/or the sequence, direction and energy of the ultrasound beams.

In some embodiments, the systems 100 may comprise a controller to control the multiple focal points of the transducer array or transducer grid. In some embodiments, the controller sets the energy per focal point, focus area per focal point or granularity and pattern of the multiple focal points. In some embodiments, the controller comprises electronics components and associated software required to configure the energy level and exposure time for each target region, the pattern of target regions to be applied, and/or initiate the targeting and ablation/cavitation at each target region.

In some embodiments, the systems 200 comprise an impedance matching layer. In order to ensure minimal acoustic loss between the meat and the transducer surface an impedance matching layer is placed onto the transducer surface. The impedance matching layer may be any material that reduces acoustic loss between the meat sample and the transducer surface, such as water or a disinfectant liquid. In some embodiments, the impedance matching layer may be a soft gel pad and can be used repeatedly.

Figure 2:
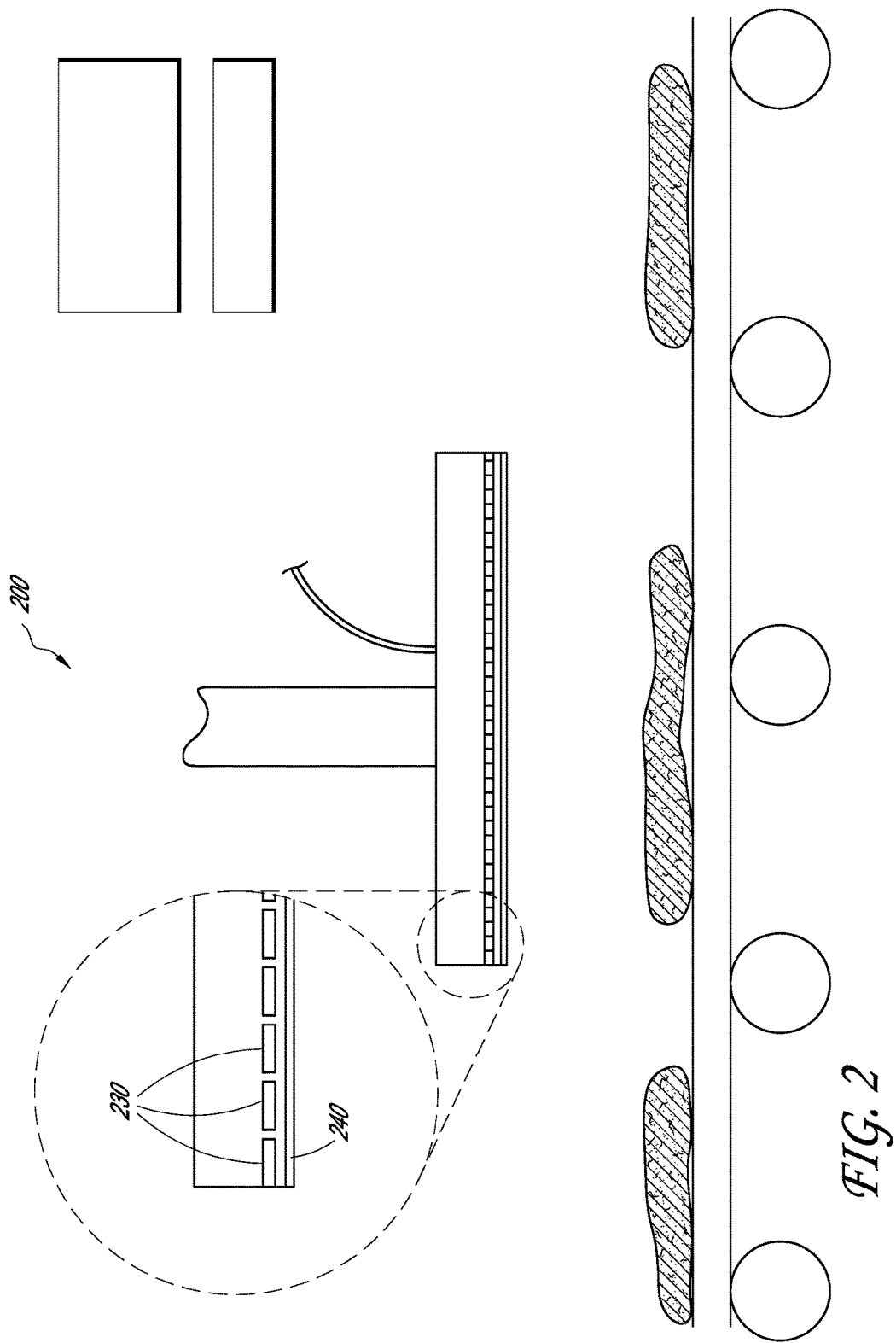
FIG. 2 shows a schematic illustration of an exemplary embodiment of an automated system for tenderizing meat showing the location of individual transducer arrays and a thin soft gel pad for acoustic impedance matching.

FIG. 2 shows a schematic illustration of an exemplary embodiment of an automated system 200 for tenderizing meat showing the location of individual transducer arrays 230 and a thin soft gel pad 240 for acoustic impedance matching.

The systems as described herein can be designed to operate on any size or cut of meat sample. In some embodiments, penetration is most effective to a depth of 25 cm and therefore larger cuts or sections where bone would shield the beam will require application from alternative/multiple directions. The systems as described herein can be used on all grades of meat. In some embodiments, maximum value may be gained from improving the tenderness of poorer quality meat and the less tender cuts.

Figure 7:
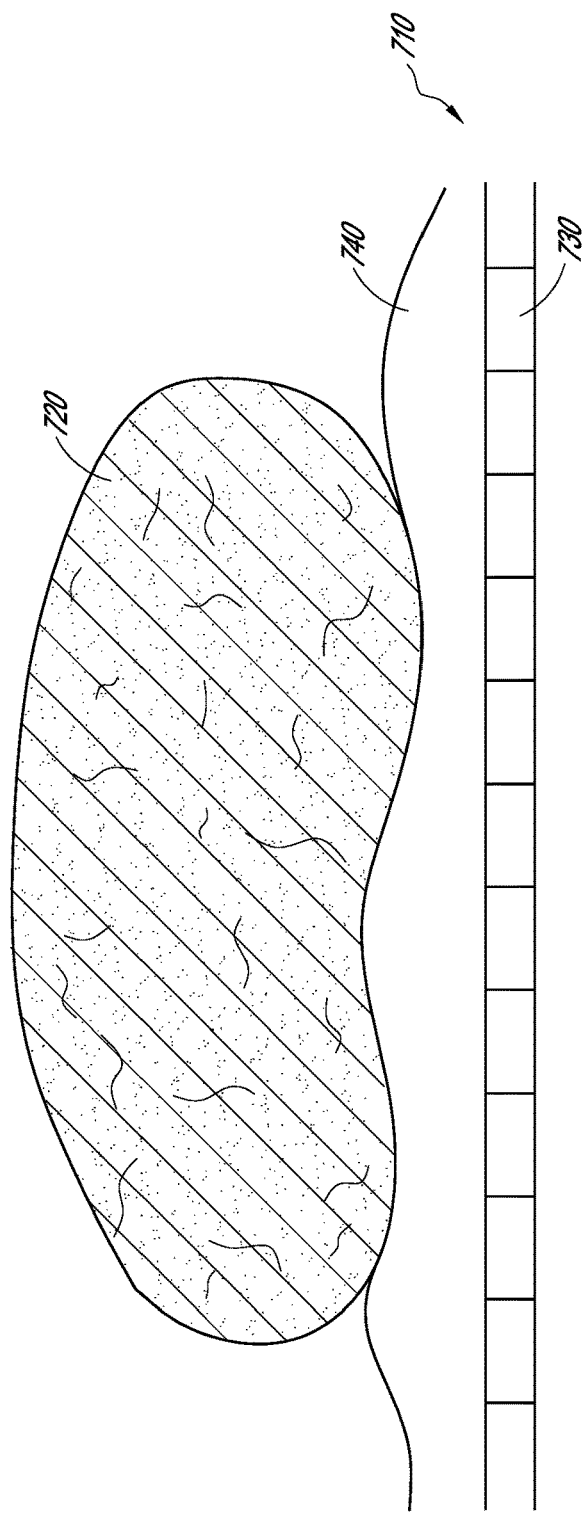
FIG. 7 shows a schematic illustration of a processing platform with a meat sample.

In some embodiments, the systems comprise a processing platform where the meat sample to be tenderized is placed. FIG. 7 shows a schematic illustration of a processing platform 710 with a meat sample 720. As illustrated, the processing platform may comprise a matrix of transducer arrays 730 and an impedance matching layer 740, which is in contact with the meat sample 720.

Meat samples from various sources may be processed using the systems as described herein. For example, the meat sample may be selected from the group consisting of bison, beef, veal, camel, cat, dog, elephant, frog, goat, guinea pig, horse, lamb, llama, pork, yak, turkey, chicken, duck, goose, crocodile, grouse, kangaroo, ostrich, partridge, pheasant, guail, rabbit, pigeon, venison, fish, crab, shrimp and whale. Meat samples of various sizes may be processed using the systems as described herein. In some embodiments, the meat sample may have a volume of 30 cm×30 cm×4 cm. The meat sample processed using the systems described herein may be suitable for various purposes, such as human consumption, animal consumption, etc.

The systems described herein may be used in a variety of environments. For example, the systems described herein may be used in a meat packing plant. In some embodiments, the systems described herein may be part of a meat packing machine.

Transducer Array

As would be appreciated by one of ordinary skill in the art, ultrasound is transmitted in acoustic waves. As an acoustic wave propagates through tissues of the meat sample, part of it is absorbed and converted to heat. With focused acoustic waves, a very small focus area can be achieved deep inside tissues of the meat sample.

Figure 3:
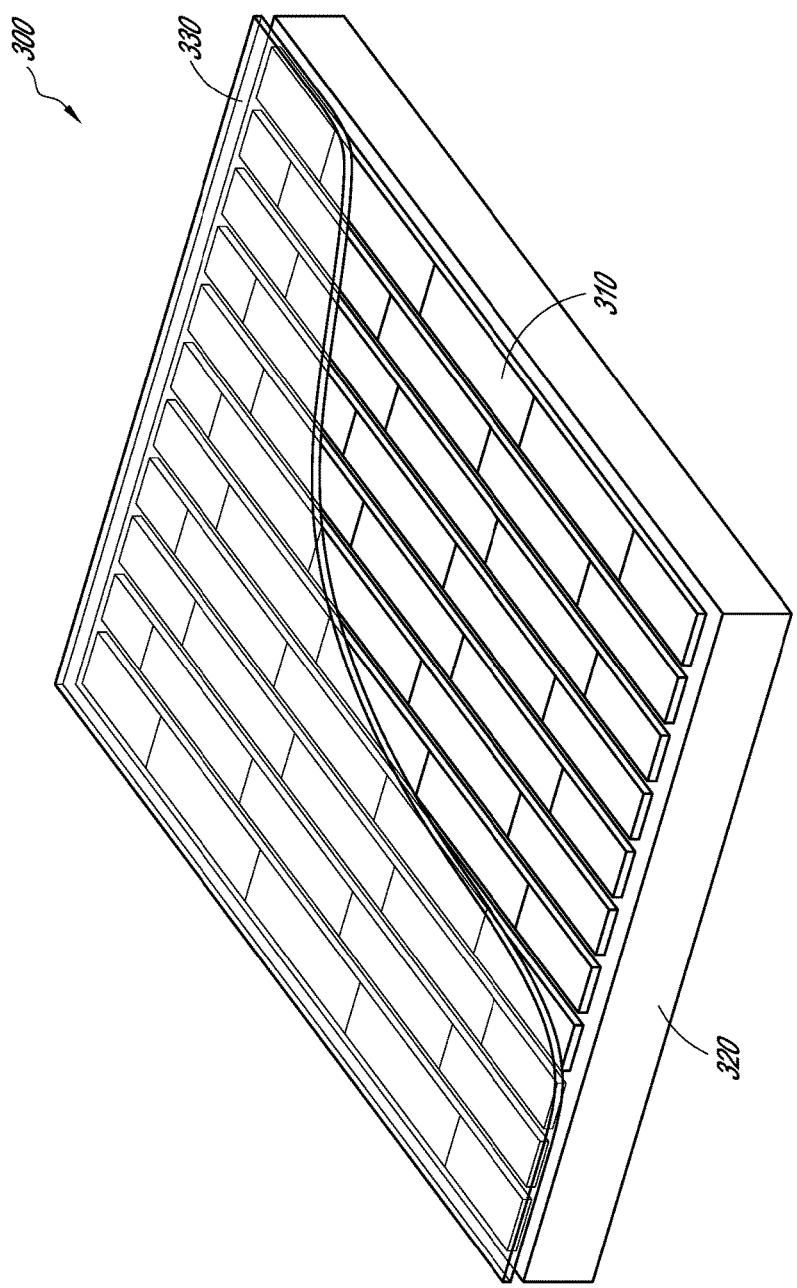
FIG. 3 shows a schematic illustration of a transducer grid having linear transducer arrays.

FIG. 3 shows a schematic illustration of a transducer grid 300 having multiple linear transducer arrays 310. The transducer arrays 310 may be formed on a substrate 320. An impedance matching layer, such as a soft gel pad 330, may be formed on the surface of the transducer arrays 310. The transducer array may have any suitable configurations. In some embodiments, the transducer array 310 may comprise multiple piezoceramic transducer elements. For example, the transducer array may comprise at least 100, at least 200, at least 500, at least 1,000, or more, piezoceramic transducer elements. In some embodiments, the transducer array may be an annular transducer array. In some embodiments, the transducer array may be a linear transducer array. In some embodiments, the devices may comprise a transducer grid with multiple transducer arrays. In some embodiments, the transducer grid may comprise at least 10, at least 20, at least 30, at least 40, at least 50, at least 60, at least 70, at least 80, at least 90, at least 100, at least 110, at least 120, at least 130, at least 140, at least 150, at least 160, at least 170, at least 180, at least 190, at least 200, at least 300, at least 400, at least 500, at least 1,000 transducer arrays.

The transducer array may have a variety of power levels suitable for tenderizing a meat sample. For example, the transducer array may have an average power of 10 W/cm$^2$, 20 W/cm$^2$, 30 W/cm$^2$, 40 W/cm$^2$, 50 W/cm$^2$, 60 W/cm$^2$, 70 W/cm$^2$, 80 W/cm$^2$, 90 W/cm$^2$, 100 W/cm$^2$, or more, or a range between two of any of the abovementioned values. In some embodiments, the transducer array may have an average power of 20-40 W/cm$^2$. It would be appreciated that the power levels of the transducer array should be optimized for cutting the collagen fibers in the meat sample, but without cooking the meat sample.

Focusing

Figure 4:
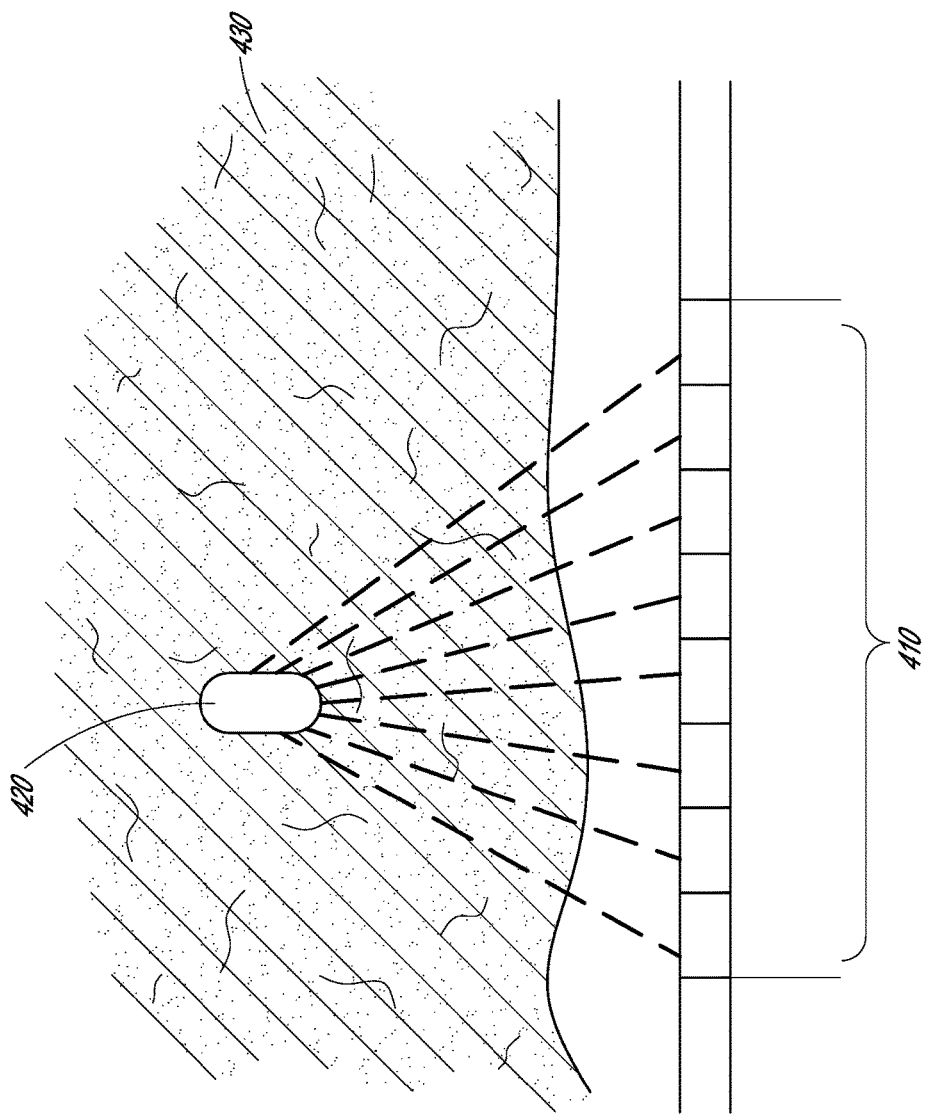
FIG. 4 shows a schematic illustration of a single transducer array having a focal region.

In some embodiments, a transducer array may be configured to have a single focal point. FIG. 4 shows a schematic illustration of a single transducer array 410 having a focal point 420 in a meat sample 430. The focal point 420 is typically cigar shaped with a size of about 1-1,000 mm$^3$. In some embodiments, the transducer array may be configured to have a focal point that is, is about, is less than, 1 mm$^3$, 2 mm$^3$, 3 mm$^3$, 4 mm$^3$, 5 mm$^3$, 6 mm$^3$, 7 mm$^3$, 8 mm$^3$, 9 mm$^3$, 10 mm$^3$, 20 mm$^3$, 30 mm$^3$, 40 mm$^3$, 50 mm, 60 mm$^3$, 70 mm$^3$, 80 mm$^3$, 90 mm$^3$, 100 mm$^3$, 200 mm$^3$, 300 mm$^3$, 400 mm$^3$, 500 mm$^3$, 600 mm$^3$, 700 mm$^3$, 800 mm$^3$, 900 mm$^3$, 1,000 mm$^3$, or a range that is between any two of the abovementioned values.

The transducer array can be focused in two ways: 1) geometrically, for example with a lens or with a spherically curved transducer; or 2) electronically, by adjusting the relative phases of elements in an array of transducers, for example, a random phased array. By dynamically adjusting the electronic signals to the elements of a random phased array, the ultrasound wave can be steered to different locations, and aberrations in the ultrasound wave due to tissue structures can be corrected.

Figure 5:
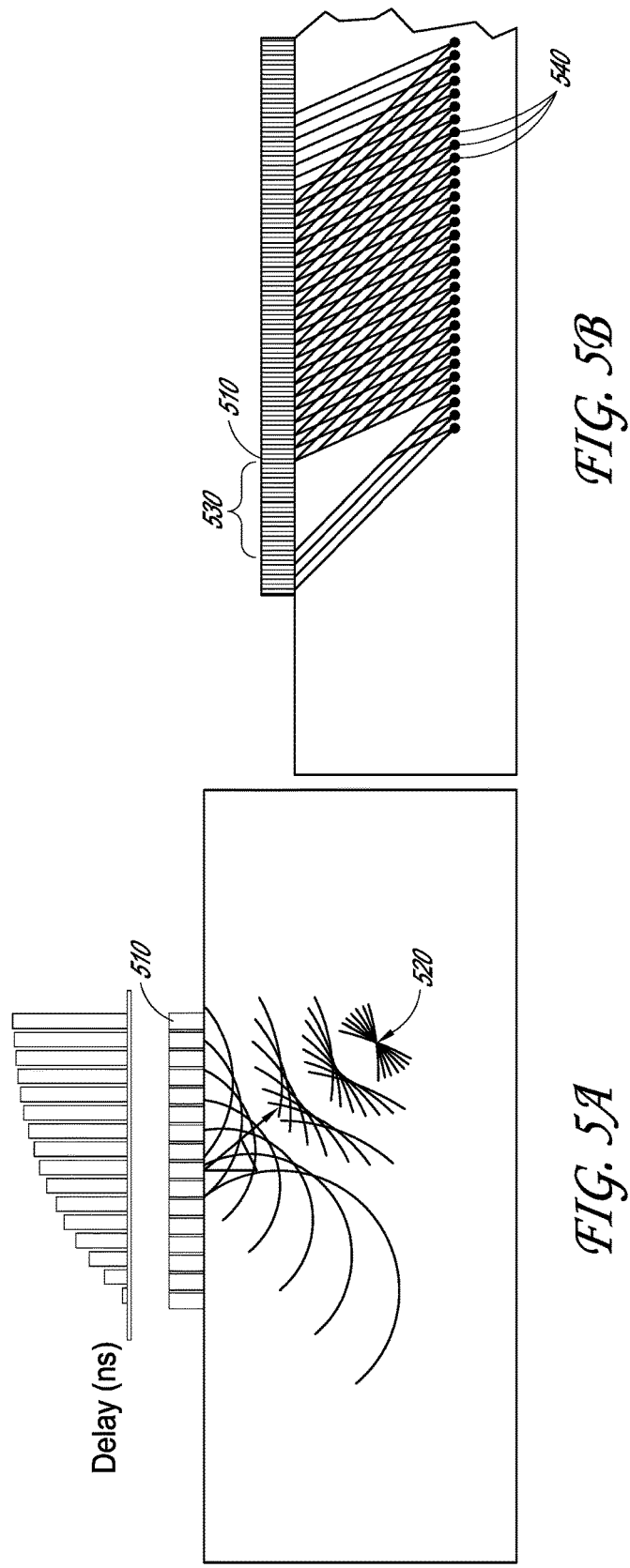
FIGS. 5A and 5B show schematic illustrations of controlling the depths of focal points by the phase-focusing technique (FIG. 5A) and the direction of scanning (FIG. 5B).

FIG. 5 shows schematic illustrations of controlling the depths of focal points (FIG. 5A) and the direction of scanning (FIG. 5B) by the phase-focusing technique. As shown in FIG. 5A, a phased linear transducer array may utilize the wave physics principle of phasing, varying the time between a series of outgoing ultrasonic pulses in such a way that the individual wave fronts generated by each element 510 in the array combine with each other to add or cancel energy in predictable ways that effectively steer and shape the sound beam. This is accomplished by pulsing the individual probe elements at slightly different times. Frequently the elements will be pulsed in groups of 4 to 32 in order to improve effective sensitivity by increasing aperture, which reduces unwanted beam spreading and enables sharper focusing. These wave fronts in turn combine constructively and destructively into a single primary wave front 520. As shown in FIG. 5B, an active group 530 of the linear transducer array elements 510 may be configured to focus on a focal point 540. Multiple focal points 540 may be formed by a number of active groups 530 of the linear transducer array 510.

The focal points can be configured to increase tenderness of the meat sample in an efficient way. Tissue damage occurs as a function of both the temperature to which the tissue is heated and how long the tissue is exposed to this heat level, i.e., the "thermal dose." By focusing at more than one place or by scanning, a specified volume of tissue can be thermally ablated. Therefore, the transducer array or transducer grid may be configured to focus on multiple focal points. For example, the transducer array or transducer grid may be configured to focus on 100, 1,000, 10,000, 100,000, 1,000,000, or more, focal points in the meat sample.

The transducer array may be configured to achieve an increase of energy at each of the multiple focal points. For example, the transducer array may be configured to achieve an increase of energy at each of the multiple focal points that is, is about, is more than, 100 fold, 200 fold, 300 fold, 400 fold, 500 fold, 600 fold, 700 fold, 800 old, 900 fold, 1,000 fold, or a range between two of any of the abovementioned values. The transducer array may be configured to achieve sufficient temperature at each of the multiple focal points. For example, the transducer array may be configured to achieve a temperature at each of the multiple focal points that is, is about, is more than, 45° C., 50° C., 55° C., 60° C., 70° C., 80° C., 90° C., 95° C., 98° C., 100° C., or a range between two of any of the abovementioned values. The transducer array may be configured to achieve sufficient power at each of the multiple focal points. For example, the transducer array may be configured to achieve a power at each of the multiple focal points that is, is about, is more than, 100 $W/cm^2$, 200 $W/cm^2$, 300 $W/cm^2$, 400 $W/cm^2$, 500 $W/cm^2$, 600 $W/cm^2$, 700 $W/cm^2$, 800 $W/cm^2$, 900 $W/cm^2$, 1,000 $W/cm^2$, 2,000 $W/cm^2$, 3,000 $W/cm^2$, 4,000 $W/cm^2$, 5,000 $W/cm^2$, 6,000 $W/cm^2$, 7,000 $W/cm^2$, 8,000 $W/cm^2$, 9,000 $W/cm^2$, 10,000 $W/cm^2$, or more, or a range between two of any of the abovementioned values. In some embodiments, the transducer array may be configured to achieve a power at each of the multiple focal points that is 1,600-2,000 $W/cm^2$. The transducer array may be configured to achieve a suitable frequency at each of the multiple focal points. For example, the transducer array may be configured to achieve a frequency at each of the multiple focal points that is, is about, is more than, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, or more, or a range between two of any of the abovementioned values. In some embodiments, the transducer array may be configured to achieve a frequency at each of the multiple focal points that is 20 kHz-1 MHz.

In some embodiments, the transducer array is configured to achieve sufficient temperature for high speed ablation at the multiple focal points in the meat sample. In some embodiments, the transducer array is configured to achieve sufficient temperature for high speed ablation at the multiple focal points in the meat sample.

Figure 6:
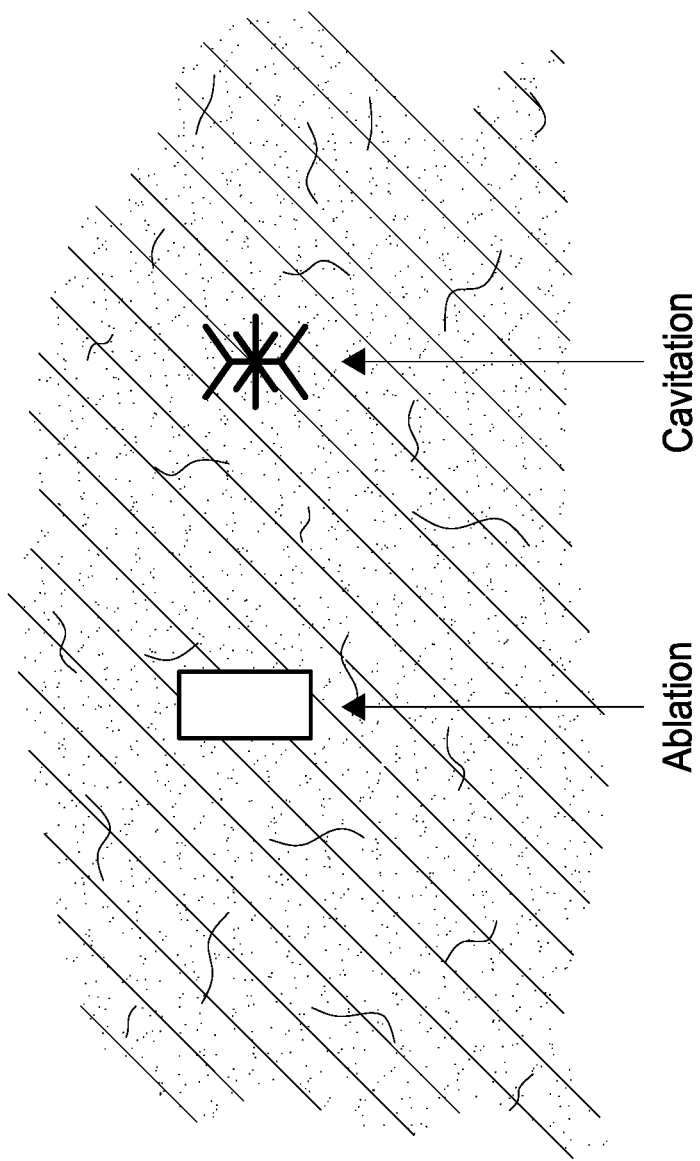
FIG. 6 shows a schematic illustration of the different impact of cavitation vs. ablation at a region within a meat sample.

"Ablation" as used herein refers to the destruction of tissue due to heat alone. For collagen the critical temperature is about 45° C., where any temperature above this will degrade it. With rapid heating a second process called "cavitation" will also destroy tissue. The cavitation process starts by the deformation of microbubbles in tissue exposed to a high acoustic intensity. These oscillate and grow as the temperature increases eventually imploding. The collapse of these bubbles is associated with a shock wave which generates jets that mechanically damage tissue. FIG. 6 shows a schematic illustration of the differences between ablation and cavitation. It will be appreciated that both ablation and cavitation may be used for increasing tenderness of the meat sample. For example, the transducer array may be configured to achieve an ablation:cavitation ration of 1:10 to 10:1. In some embodiments, the transducer arrays may be configured to achieve ablation substantially alone. In some embodiments, the transducer arrays may be configured to achieve cavitation substantially alone.

It will be appreciated that cavitation may be advantageous to ablation under certain circumstances as it does not "cook" the target region but causes mechanical damage to the tissue. In some embodiments, cavitation can be used to break collagen fibers and the cross-links between fibers, both being a source of toughness in meat. Ablation requires less energy but more time to degrade the collagen, whereas cavitation requires greater energy and less time and provides a more physical disruption of the collagen network.

In some embodiments, the energy density available at the focal point of a transducer array is sufficient to ablate meat collagen at a rate of about 100 $cm^2$ per second. In some embodiments, the devices are capable of ablating at least 100, 500, 1,000, 2,000, 5,000 or more target regions per second. In some embodiments, the devices are capable of a cavitation speed of 10,000-100,000 or more target regions per second.

In some embodiments, the multiple focal points of the transducer array or transducer grid are arranged to form a pattern of target regions. For example, the target regions are arranged to be distributed in a regular grid pattern throughout the sample volume such that the long chains and cross linkages are broken down. The effect is an improvement in tenderness and is similar to mechanical tenderizing by piercing.

Directed Processing by Mapping

In some embodiments, a non-invasive technique may be used to scan the meat sample to identify regions of high collagen content and then direct a greater concentration of focal points to these areas. In some embodiments, the systems may comprise a mapping device configured to identify target regions for ablation or cavitation in a meat sample. The mapping device may use a variety of techniques to identify regions of thick collagen in a meat sample.

Since the acoustic impedance of collagen is much higher than that of other tissue components, the regions of high collagen content will show up as brighter regions in a B mode ultrasound image. Hence ultrasound can be used to create a 3D map of regions of higher collagen content based on the brightness of the corresponding region.

Since collagen is naturally stiffer than surrounding tissue, muscle cells and fat, an ultrasound based technique called elastography can be used to map the relative stiffness of a meat sample and used as the basis for directing the ablation/cavitation process.

CT scans provide very high resolution 3D images of tissues. In some embodiments, a CT scan of a meat sample can be used to identify regions of thick collagen which can be subsequently targeted for ablation/Cavitation.

A variety of X-ray imaging modalities are available for producing high resolution images of soft tissues for medical applications. Since collagen fibers are denser than other meat components, with appropriate sensitivity settings, X-ray imaging can also be used to locate the thicker collagen and set these as targets for ablation/cavitation, Methods and Uses for Tenderizing Meat Samples Some embodiments disclosed herein provide methods and uses for tenderizing a meat sample using systems as described herein. In some embodiments, the methods and uses comprise placing a meat sample on an impedance matching layer of the devices, and focusing the transducer array to multiple focal points, wherein the tenderness of the meat sample is increased. In some embodiments, tenderness of the meat sample may be measured by the force needed to shear muscles. This is known as the "Warner-Bratzler shear force test." The units of measurement are kilograms of force needed to shear a 1 cubic centimeter muscle sample. In some embodiments, tenderness of the meat sample may be measured by a straight sensory panel test, where ordinary people eat the meat and record their perception of its tenderness. For example, the tenderest cut, tenderloin, has a shear force of approximately 2.6, and the toughest meat cut, top round steak, has a shear force of 5.3.

In some embodiments, the methods and uses comprise setting the parameters for the meat sample to be tenderized. For example, energy per target region, duration of tenderizing, locations of focal points and the granularity and pattern of ablation/cavitation target regions may be set either manually or automatically. In some embodiments, the meat sample is placed on a processing platform, and the tenderizing process is initiated and continued to completion. In some embodiments, the meat sample is removed and the processing platform is sanitized, e.g., using an energy source such as UV radiation, and the process continues with the next meat sample.

In some embodiments, the methods and uses are performed using a handheld system as described herein. In some embodiments, the processing platform and the controller are combined into a single smaller device which can be used in the field by an operator. Processing is as per the steps noted above, but in this case the operator presses the processing platform onto the piece of meat and initiates the ablation/cavitation process. Since the processing platform only covers a smaller area and may not cover the entire piece of meat sample, the operator may place the processing platform at various points on the meat sample until the whole meat sample has been processed. These methods may be ideal for meat samples that have bone in them where in a non-hand-held embodiment bone would act as a shield for parts of the meat. For example this method could be used on a carcass in situ.

In some embodiments, the methods and uses are performed using an automated system as described herein. In some embodiments the automated system may be part of an automated processing plant. A conveyor may transport each meat sample to be tenderized over the processing platform. As each meat sample arrives the tenderizing process is automatically initiated. In some embodiments, the methods and uses are used with a moving conveyor. In some embodiments, at an appropriate speed, the processing platform does not need to be extensive as the piece will be progressively processed as it passes over potentially a single transducer array or a plurality of transducer arrays.

In some embodiments, the automated meat tenderizing system described herein may be controlled by a control computer for such parameters as the timing and speed of the conveyor, the movement of the head assembly, and others. In some embodiments, a number of parameters may be set at levels that result in an improved tenderness of the meat sample. These parameters include the power level, the frequency of the phase-focused ultrasound waves, and the density/pattern of the target regions.

The automated systems described herein could operate in a batch mode where meat samples of a certain known initial quality would be processed with the relevant parameters set at predetermined values for optimum tenderized outcomes. A new batch of meat samples with a different initial quality would require the settings to be changed.

In some embodiments, changing the parameter settings may involve manual intervention to the extent of dialing up the meat quality to be batch processed where the computer would adjust all the parameters to match the incoming batch of meat. In some embodiments, the initial meat quality could be automatically determined as to its initial tenderness, and this measurement would be used as an input for automatically setting the required tenderizing parameters for the automated system. This would provide a means for fully automating the tenderizing process.

In some embodiments, an automated method may comprise:
a) placing a meat sample on a processing platform;
b) adjusting a distance between a head assembly and the meat sample by lowering the head assembly, or raising or the platform, or both; and
c) initiating the tenderizing process by a controller which in turn controls a transducer electronics, wherein the tenderizing process comprises:
i) generating an electrical signal for each transducer in each transducer array by the controller;
ii) generating a focused ultrasound wave by each transducer;
iii) focusing each transducer to a target region; and
iv) delivering a sufficient amount of energy to the target region to destroy collagen fibers at the target region by cavitation and/or heat ablation without affecting adjacent muscle tissue,
wherein the target regions are configured by the controller. The head may be retracted or the platform may be lowered, or both.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for tenderizing meat comprising:
   a transducer array;
   an impedance matching layer; and
   a controller,
   wherein the transducer array is configured by the controller to transmit ultrasound to multiple focal points in a meat sample in contact with the impedance matching layer.

2. The system of claim 1, wherein the transducer array comprises a plurality of piezoceramic transducer elements.

3. The system of claim 2, wherein the transducer array comprises at least 100 piezoceramic transducer elements.

4. The system of claim 2, wherein the transducer array comprises at least 500 piezoceramic transducer elements.

5. The system of claim 2, wherein the transducer array comprises at least 1,000 piezoceramic transducer elements.

6. The system of claim 1, wherein the transducer array is a random phased array.

7. The system of claim 6, wherein the random phased array is configured to transmit ultrasound to at least 5 focal points.

8. The system of claim 6, wherein the random phased array is configured to transmit ultrasound to at least 10 focal points.

9. The system of claim 1, wherein each focal point is about 100 mm3.

10. The system of claim 1, wherein each focal point is about 1,000 mm3.

11. The system of claim 1, wherein the transducer array is a linear transducer array.

12. The system of claim 1, wherein the transducer array is an annular transducer array.

13. The system of claim 12, wherein the annular transducer array has a convergence angle of less than 80°.

14. The system of claim 12, wherein the annular transducer array has a convergence angle of less than 40°.

15. The system of claim 12, wherein the annular transducer array has a convergence angle of less than 20°.

16. The system of claim 12, wherein the annular transducer array has a convergence angle of less than 10°.

17. The system of claim 12, wherein the annular transducer array has a convergence angle of less than 5°.

18. The system of claim 1, wherein the transducer array is configured to achieve sufficient energy for high speed cavitation at the multiple focal points in the meat sample.

19. The system of claim 1, wherein the transducer array is configured to achieve sufficient temperature for high speed ablation at the multiple focal points in the meat sample.

20. The system of claim 1, wherein the transducer array has an average power of 20-40 W/cm 2.

21. The system of claim 1, wherein the transducer array achieves at least 100 fold increase of energy at each of the multiple focal points.

22. The system of claim 1, wherein the transducer array achieves at least 300 fold increase of energy at each of the multiple focal points.

23. The system of claim 1, wherein the transducer array achieves a temperature of 45-100° C., a power of 100-10,000 W/cm 2, and a frequency of 20 kHz-20 MHz at each of the multiple focal points.

24. The system of claim 1, wherein the transducer array achieves a power of 1,600-2,000 W/cm2, and a frequency of 20 kHz-1 MHz at each of the multiple focal points.

25. The system of claim 1, wherein the multiple focal points of the transducer array are arranged to form a pattern.

26. The system of claim 25, wherein the multiple focal points of the transducer array are arranged to form a three-dimensional pattern.

27. The system of claim 1, wherein the impedance matching layer comprises a gel pad.

28. The system of claim 1, wherein the controller sets the energy per focal point, focus area per focal point or granularity and pattern of the multiple focal points.

29. The system of claim 1, further comprising a mapping device configured to identify target regions for ablation or cavitation in the meat sample.

30. The system of claim 29, wherein the mapping device comprises an ultrasound imaging device.

31. The system of claim 30, wherein the ultrasound imaging device creates a three-dimensional map of a plurality of target regions in the meat sample.

32. The system of claim 29, wherein the mapping device comprises an ultrasound elastography device.

33. The system of claim 32, wherein the ultrasound elastography device maps the relative stiffness of the meat sample.

34. The system of claim 29, wherein the mapping device comprises a computed axial tomography (CT) scanning device.

35. The system of claim 34, wherein the CT scanning device creates a three-dimensional map of a plurality of target regions in the meat sample.

36. The system of claim 29, wherein the mapping device comprises an X-ray imaging device.

37. The system of claim 36, wherein the X-ray imaging device creates a three-dimensional map of a plurality of target regions in the meat sample.

38. The system of claim 1, wherein the system comprises a plurality of transducer arrays.

39. The system of claim 1, wherein the system is a hand-held system.

40. The system of claim 1, wherein the system is an automated system.

41. The system of claim 40, wherein the automated system comprises a conveyor to transport the meat sample.

42. The system of claim 40, wherein the automated system comprises a sensor that detects the presence of the meat sample.

43. The system of claim 40, wherein the automated system comprises a head assembly.

44. The system of claim 43, wherein the head assembly comprises the transducer array.

45. The system of claim 43, wherein the automated system comprises a moving mechanism for the head assembly.

46. The system of claim 40, wherein the automated system comprises a computer.

47. A method for tenderizing meat using a system of claim 1, comprising:
   a) placing a meat sample in contact with the impedance matching layer; and
   b) focusing the transducer array to the multiple focal points in the meat sample using the controller,
   wherein the tenderness of the meat sample is increased.

48. The method of claim 47, comprising cavitating collagen fibers at the multiple focal points in the meat sample.

49. The method of claim 48, wherein the cavitation is high-speed cavitation.

50. The method of claim 47, comprising ablating collagen fibers at the multiple focal points in the meat sample.

51. The method of claim 50, wherein the ablation is high-speed ablation.

52. The method of claim 47, further comprising identifying the multiple focal points in the meat sample using a mapping device.

53. The method of claim 47, further comprising setting the energy per focal point, focus area per focal point or granularity and pattern of the multiple focal points in the meat sample.

54. The method of claim 47, wherein the transducer array is a linear transducer array.

55. The method of claim 54, wherein the focusing comprises phase focusing the linear transducer array.

56. The method of claim 47, further comprising transporting the meat sample using a conveyor.

57. The method of claim 47, further comprising detecting the meat sample using a sensor.

58. The method of claim 57, comprising firing the transducer array at the meat sample if the meat sample is detected by the sensor.

59. The method of claim 47, wherein the transducer array is mounted on a head assembly.

60. The method of claim 59, comprising lowering the head assembly so that an impedance matching layer is in contact with the meat sample.

61. The method of claim 47, wherein more than one meat samples are processed simultaneously.

62. The method of claim 47, wherein at least 10 meat samples are processed simultaneously.

63. The method of claim 47, wherein the meat sample comprises sliced meat or ground meat.

64. The method of claim 47, wherein the meat sample is selected from the group consisting of bison, beef, veal, camel, cat, dog, elephant, frog, goat, guinea pig, horse, lamb, llama, pork, yak, turkey, chicken, duck, goose, crocodile, grouse, kangaroo, ostrich, partridge, pheasant, quail, rabbit, pigeon, venison, fish, crab, shrimp and whale.

65. The method of claim 47, wherein the meat sample is for human or animal consumption.

66. Use of a system of claim 1 for tenderizing a meat sample, wherein the tenderness of the meat sample is increased.

67. The use of claim 66, comprising placing a meat sample in contact with the impedance matching layer.

68. The use of claim 66, comprising focusing the transducer array to the multiple focal points in the meat sample using the controller.

69. The use of claim 66, comprising cavitating the collagen fibers at the multiple focal points in the meat sample.

70. The use of claim 69, wherein the cavitation is high-speed cavitation.

71. The use of claim 66, comprising ablating the collagen fibers at the multiple focal points in the meat sample.

72. The use of claim 71, wherein the ablation is high-speed ablation.

73. The use of claim 66, further comprising identifying target regions in the meat sample for ablation or cavitation using a mapping device.

74. The use of claim 66, further comprising setting the energy per focal point, focus area per focal point or granularity and pattern of the multiple focal points.

75. The use of claim 66, for simultaneously processing more than one meat samples.

76. The use of claim 66, for simultaneously processing more than 10 meat samples.

* * * * *